United States Patent [19]
Blach

[11] Patent Number: 5,476,319
[45] Date of Patent: Dec. 19, 1995

[54] MIXER FOR VISCOUS LIQUIDS AND MASSES

[76] Inventor: Josef A. Blach, Hof 120, A-5310 Mondsee, Austria

[21] Appl. No.: 252,414

[22] Filed: Jun. 1, 1994

[30]  Foreign Application Priority Data

Jun. 1, 1993 [AT] Austria ................. 1053/93

[51] Int. Cl.⁶ ....................................... B01F 7/02
[52] U.S. Cl. .................. 366/83; 366/139; 425/204
[58] Field of Search .................. 366/69, 79, 85, 366/96, 97, 144, 147, 149, 287, 288, 297, 301, 139, 83; 425/204, 208, 209; 422/131, 134, 135

[56]  References Cited

U.S. PATENT DOCUMENTS

| | | |
|---|---|---|
| 4,591,487 | 5/1986 | Fritsch . |
| 4,686,088 | 8/1987 | Fritsch ................ 366/85 |
| 5,020,916 | 6/1991 | Fritsch ................ 366/97 |
| 5,108,711 | 4/1992 | Chszaniecki ........... 425/204 |

FOREIGN PATENT DOCUMENTS

| | | |
|---|---|---|
| 439900 | 1/1927 | Germany . |
| 3030541C2 | 11/1982 | Germany . |

*Primary Examiner*—Robert W. Jenkins
*Attorney, Agent, or Firm*—Flynn, Thiel, Boutell & Tanis

[57] ABSTRACT

A mixer for viscous liquids and masses has a stationary first housing of circular cross section preferably disposed horizontally with inlet and outlet means for the material to be processed and surrounding a driven inner coaxial rotatably mounted second housing. The annular space jointly limited by the two housings with closing portions disposed on the faces contains a number of axially parallel mixer shafts driven in the same direction and disposed in a ring which perform a common revolving motion about the longitudinal axis of the housing. The mixer shafts extend with their envelopes as far as the inner and outer walls of the two housings leaving small gaps free. The mixer shafts formed as screw conveyors at least in portions are combined into meshing groups.

17 Claims, 6 Drawing Sheets

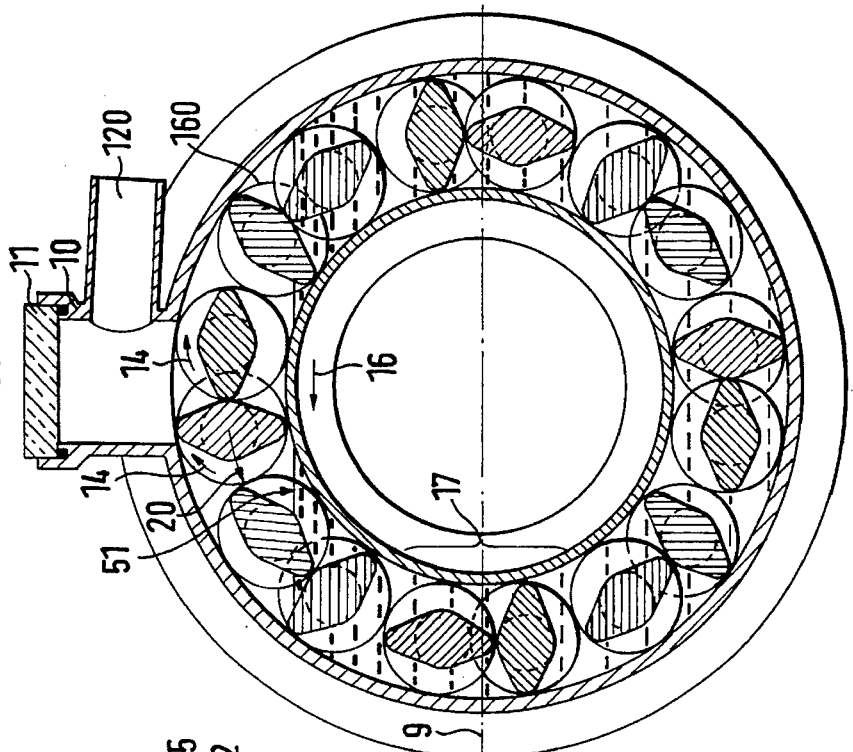
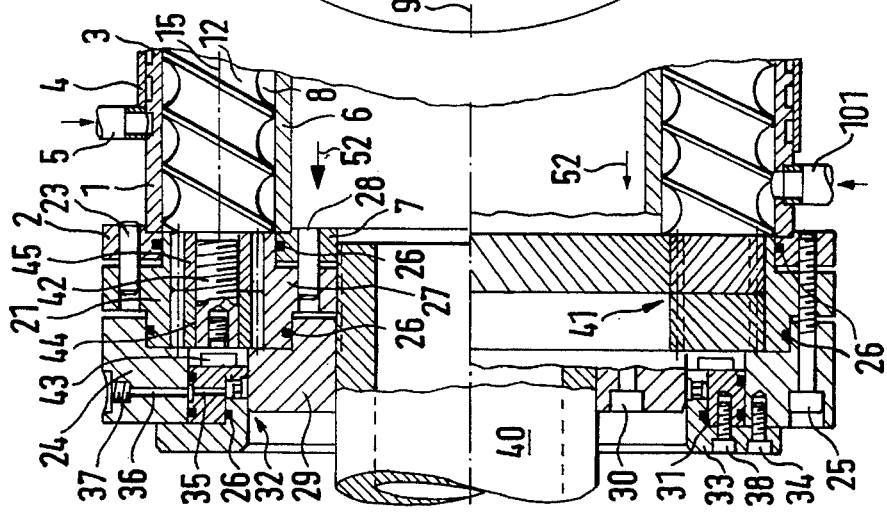

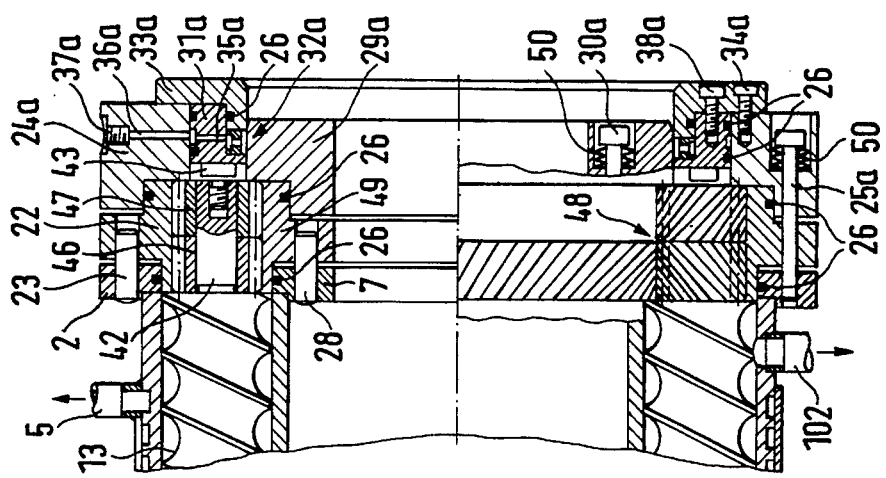
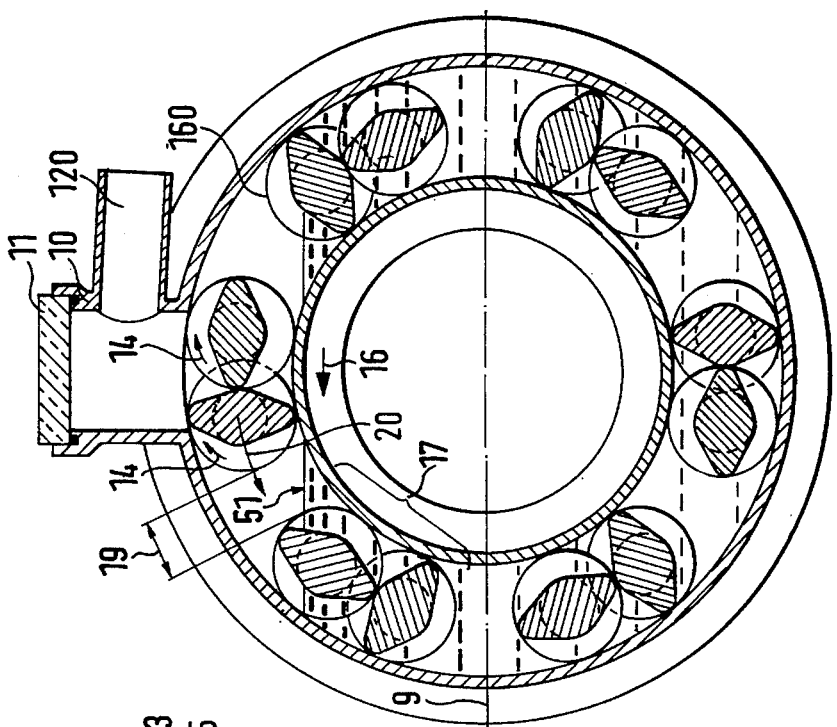
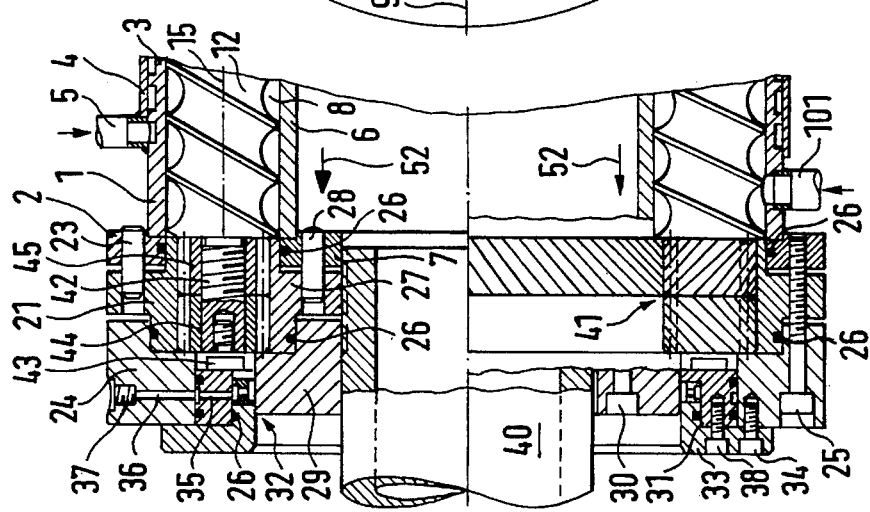

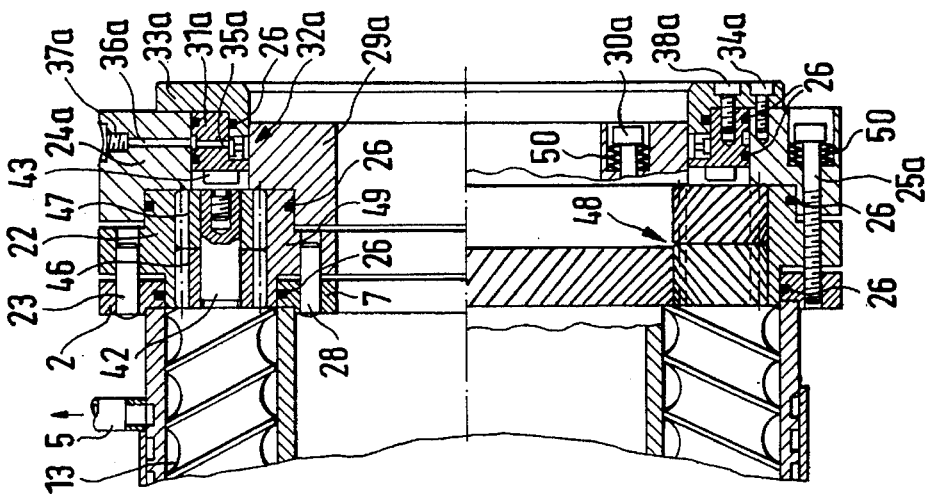
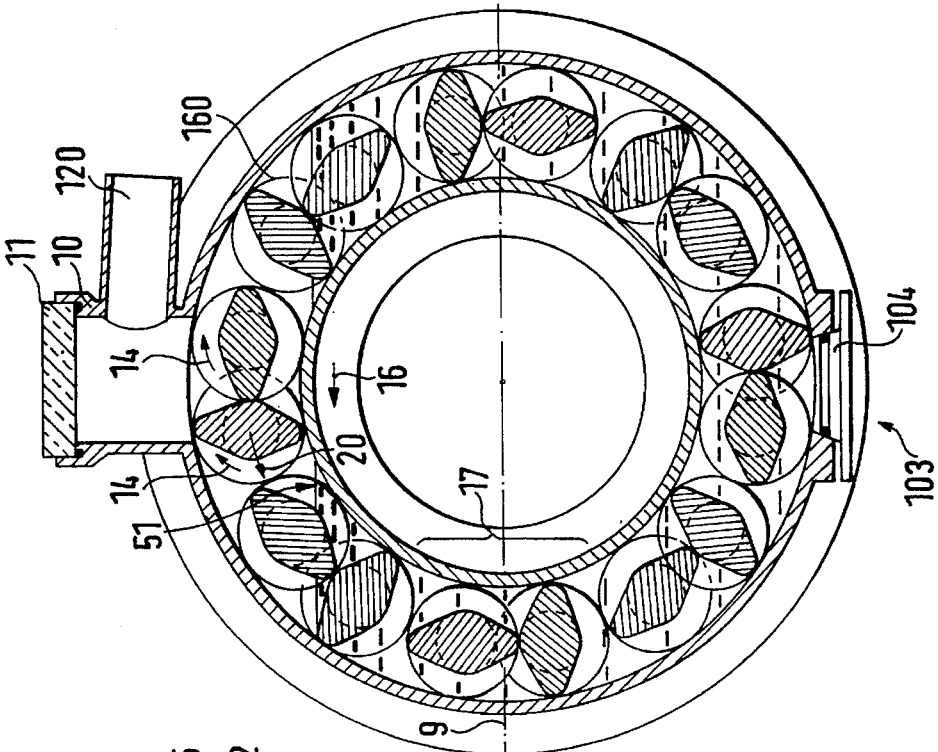
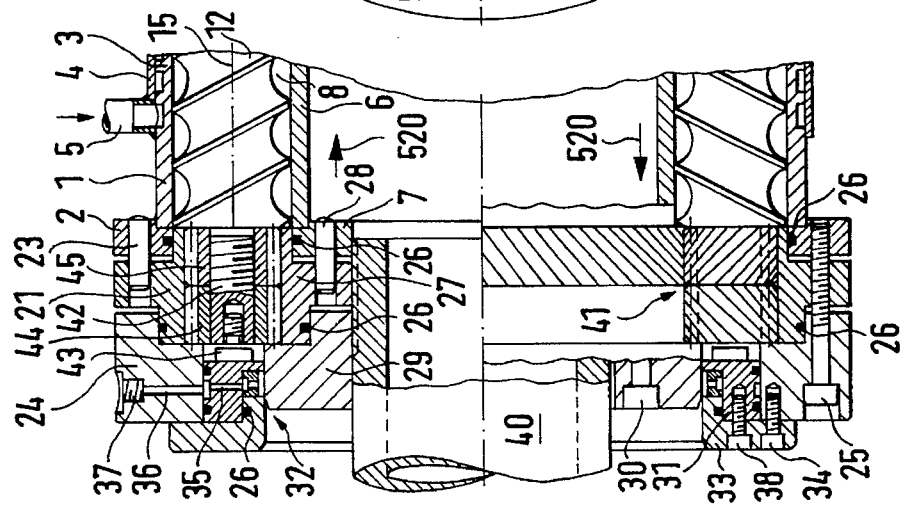

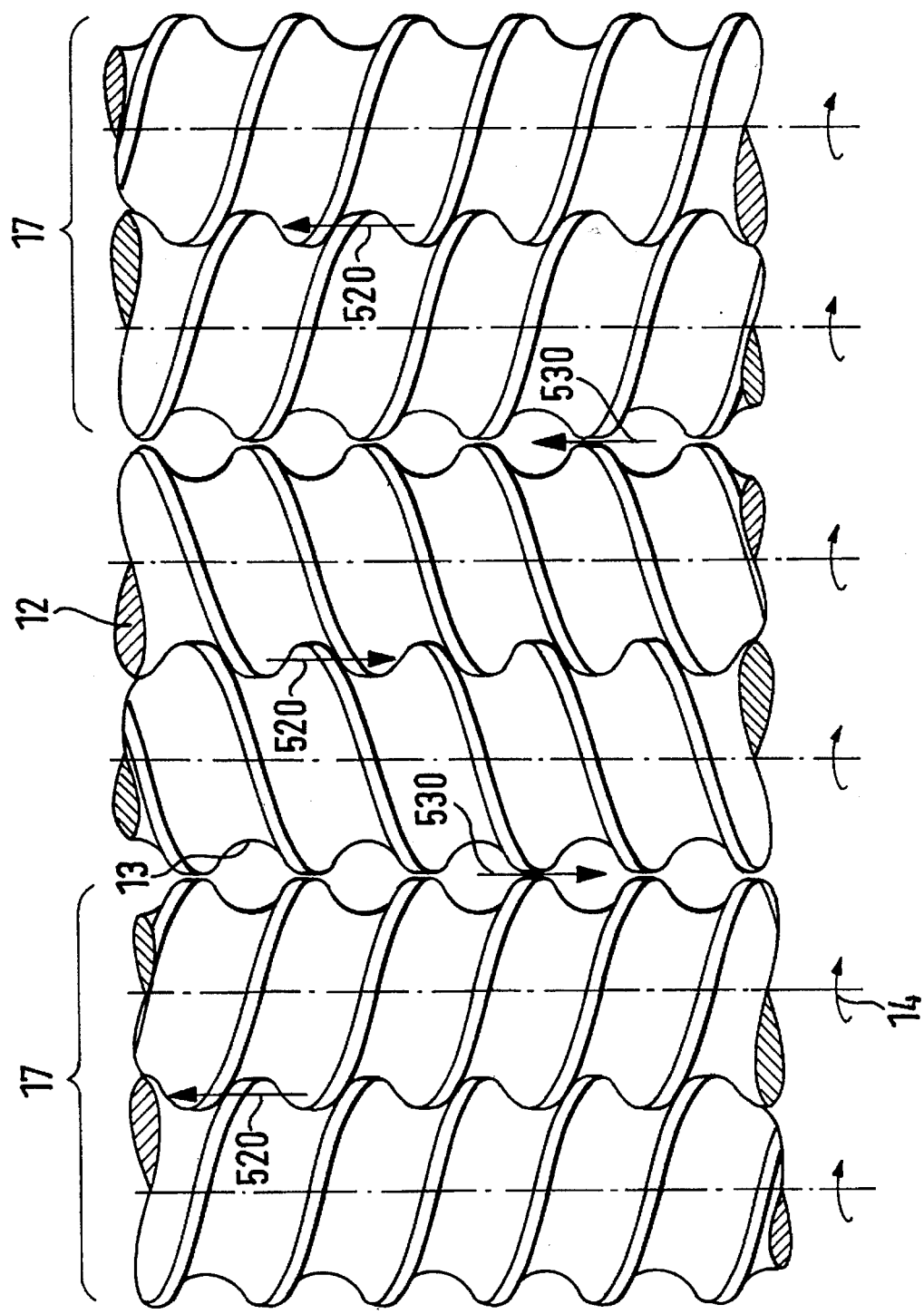

MIXER FOR VISCOUS LIQUIDS AND MASSES

FIELD OF THE INVENTION

The present invention relates to a mixer for viscous liquids and masses having a housing of circular cross section with feeding and removing means for the material to be processed and a number of axially parallel mixer shafts driven in the same direction which are disposed in a ring within the housing and perform a common revolving motion about the longitudinal axis of the housing.

BACKGROUND OF THE INVENTION

Mixers for viscous liquids and masses are known in manifold embodiments. They usually work with stirring or kneading tools which rotate within a housing and might perform a planetary motion in addition to the rotary motion about their own axis. For example DE-C 439 990, from which the invention departs, describes an apparatus for refining chocolate or similar plastic masses wherein mixer shafts in the form of rolls are disposed within a cylindrical housing so as to revolve about a center roll and simultaneously rotate about their own axes in the same direction, all or individual rolls—possibly including the center roll—having openings such that the material to be processed is able to penetrate them perpendicular to their longitudinal axis. The roll openings can be twisted helically, the result being that the material to be processed undergoes not only a motion perpendicular to the roll axis but also one in the longitudinal direction of the rolls. This device requires comparatively complicated mixing tools and is not readily suitable for processing viscous liquids for example. Furthermore it is difficult to clean, and mainly limited to its special purpose, namely the refining of chocolate masses.

In addition there are so-called thin-layer reactors (compare for example DE-C 30 30 541) which likewise work with shafts disposed in a ring within a cylindrical housing. The shafts bear meshing, in particular disk-shaped treating members for the material to be processed which limit thin gaps with each other through which the material is conveyed while being simultaneously spread in a thin layer. The material to be processed is brought from a thick-layer side onto a thin-layer side where a vacuum may be effective to cause degassing of the material spread in a thin layer.

With such thin-layer reactors one strives for a comparatively long sojourn time of the material to be processed in the reactor. Although they permit viscous media, for example molten polymer masses or the like, to be mixed with additives they are neither intended nor suitable for use strictly as mixers for viscous liquids or masses.

SUMMARY OF THE INVENTION

The invention is directed to the problem of providing a mixer characterized by a very good mixing effect and more versatile possibilities of application while having a simple structure, whereby the mixing tools are simultaneously forced to clean one another on their entire surfaces perfused by the material to be processed due to their differential speeds relative to one other.

This mixer can be constructed alternatively as a continuous or discontinuous mixer, in the first case having material to be mixed flowing through it in continuous operation and in the second case processing a certain amount of material batchwise. Typical applications for such continuous mixers are for example the production of pharmaceuticals, lubricating greases, paints, lacquers, adhesives, etc., while discontinuous mixers are used in many ways in pharmacy, chemistry and the like when continuous operation would be inexpedient for economic reasons due to the small batch amounts.

In the new mixer adjacent screw conveyors are combined into groups, each group containing at least two screw conveyors meshing with their spirals of like pitch while the contiguous screw conveyors of adjacent groups are disengaged from each other. The material to be processed is conveyed in a certain axial direction by the screw conveyors of each group generally comprising one pair of screw conveyors meshing with their spirals, while there is no axial conveyance in the areas between adjacent groups, the so-called "mixing wedges". In these areas a backflow can form; simultaneously a level compensation takes place. With continuous mixers the screw conveyors of the mixer shafts of all groups have the same conveying direction, while with discontinuous mixers the assembly is such that the screw conveyors of the mixer shafts of adjacent groups have an opposite conveying direction. In particular with discontinuous mixers it is expedient if the contiguous screw conveyors of adjacent groups are directly adjoining with the envelopes of their spirals, except for the necessary narrow working gap. Chiefly with continuous mixers, however, it can be advantageous if contiguous screw conveyors of adjacent groups limit a space therebetween which is selected in accordance with the viscosity of the material to be processed. In general, the higher the viscosity the greater the spacing between adjacent groups.

Apart from exceptional cases, the two interconnected housings of the new mixer are disposed horizontally, i.e. with horizontal alignment of the mixer shafts in the working position. The working level for the material to be processed is then advantageously located in the annular space approximately in the area of the upper boundary of the inner housing. It should be noted that the annular space must never be completely filled with material to be processed.

The outer housing can be provided with connecting means for an overpressure or vacuum source, making it possible for example to vent released gaseous components during the mixing operation, or to have a mixing operation take place under gas overpressure, for example in a protective atmosphere, depending on the type of material to be processed.

Because the inner housing is of rotating design with the outer housing stationary, the drive of the mixer shafts can be derived from the rotating inner housing, the inner housing being fitted to be coupled with a power source. This can be solved constructionally by connecting the inner housing with at least one coaxial gearwheel associated with an internal geared wheel disposed in rotationally firm fashion on the outer housing, the mixer shafts bearing rotationally firm pinions engaging the gearwheel and the internal geared wheel.

If the gearwheel, internal geared wheel and pinions are spur toothed, axial bearings fixed on the housing should be provided in the area of the closing portions on the faces of the annular space to take up the axial forces acting on the mixer shafts during operation of the mixer shafts.

Such separate axial bearings can be dispensed with if the mixer shafts are supported on the end only via their pinions on an associated internal geared wheel and a gearwheel associated with the inner housing, whereby the inner housing is also supported on the end only via a gearwheel, the pinions of the mixer shafts and an internal geared wheel on the outer housing. The axial forces are thereby taken up by the gearing portions present for driving the mixer shafts themselves.

For this purpose the particular gearwheel, the corresponding internal geared wheel and the pinions are helical toothed. On at least one end of the mixer shafts the helical toothed gearwheel of the inner housing has associated therewith on the outer housing an internal geared wheel with opposing helical toothing, each mixer shaft bearing on the end an accordingly toothed pair of pinions, one pinion of which engages the gearwheel and the other of which the internal geared wheel.

Depending on the purpose of the desired sojourn time of the material to be processed in the mixer and the mixer's mode of operation (continuous or discontinuous) one can use single-, double-, triple- or multi-start worm shafts. In general, worm shafts with a higher number of starts (in particular triple-start worms) obtain a better mixing effect with a short sojourn time. For reasons of economy it is expedient to construct the mixer so that the worm shafts can be readily replaced without requiring any great reconstruction measures. To make this possible the pinions are advantageously connected positively with the particular mixer shaft by means of a serration whose number of teeth is divisible integrally by the number of mixer shafts. As precise tests have shown, this permits the correct mutual angular association to be obtained for all cooperating pairs of screw conveyors by simply slipping the pinions onto the mixer shafts in the corresponding angular position.

The mixer shafts are preferably supported axially and radially on the end only via their pinions on an internal geared wheel and a gearwheel. Similarly it is advantageous to support the inner housing on the end only via its gearwheel, the pinions of the mixer shafts and the associated internal geared wheel on the outer housing. Also, the internal geared wheel and/or the gearwheel are braced preferably elastically against the associated mixer shafts in the axial direction on at least one side of the housing.

BRIEF DESCRIPTION OF THE DRAWINGS

The drawing shows embodiment examples of the object of the invention.

FIG. 1 shows a continuous vacuum mixer according to the invention in central cross section in a side view, FIGS. 2, 3 show details of the mixer of FIG. 1 in axial longitudinal section, illustrating the bearing and driving elements of the mixer shafts of the mixer of FIG. 1 at the driving side and the side opposite, FIG. 4 shows the continuous vacuum mixer of FIG. 1 in a modified embodiment and a corresponding cross-sectional view, FIGS. 5, 6 show the mixer of FIG. 4 in axial longitudinal section in a side view and in details according to FIGS. 2, 3, FIG. 8 shows a discontinuous vacuum mixer according to the invention in cross section in a side view, FIGS. 9, 10 show the mixer of FIG. 8 in axial longitudinal section in a side view and in details according to FIGS. 2, 3, FIG. 11 shows a developed view of the screw conveyors of three adjacent groups of screw conveyors of the mixer of FIG. 8 in a top view, in a detail and on a different scale.

DETAILED DESCRIPTION

Figure 7:
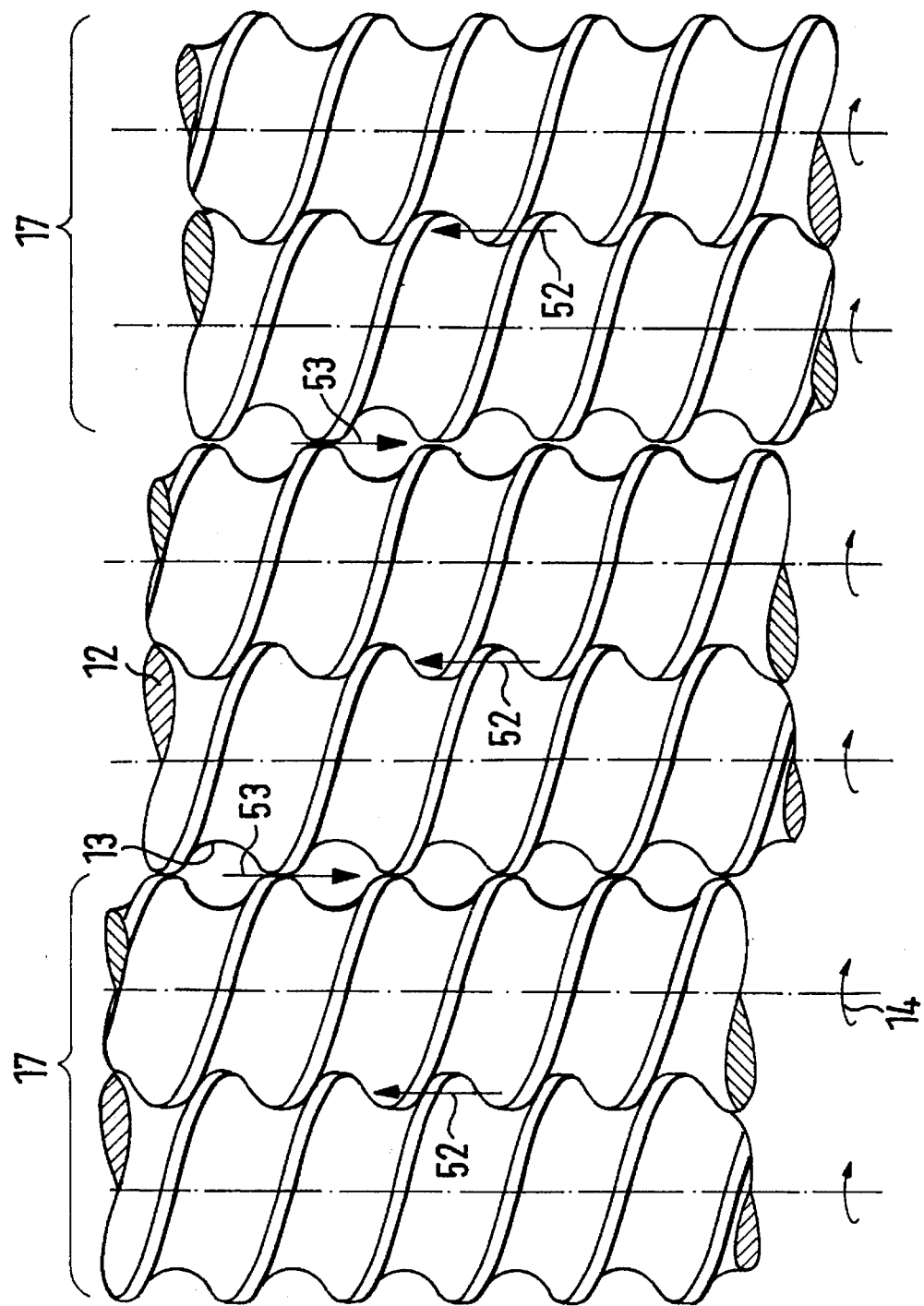
FIG. 7 shows a developed view of the screw conveyors of two adjacent groups of screw conveyors of the mixer of FIG. 1 in a detail, in a top view and on a different scale.

The continuous vacuum mixer shown in a first embodiment in FIGS. 1 to 3 has cylindrical outer housing 1 bearing on each face sealingly welded ring flange 2 and provided on its outer circumferential surface over most of its axial length with circumferential spiral grooves 3 closed off from the outside by jacket 4. During operation a tempering medium, for example oil, water or the like, can flow through spiral grooves 3, if required, in order to remove heat from or supply heat to the material to be processed during the mixing process. A pair of connecting pieces 5 communicating with spiral grooves 3 serve to connect a corresponding tempering medium source.

Outer housing 1 surrounds coaxial cylindrical inner housing 6 of smaller diameter which bears on each face tightly welded, inwardly protruding ring flange 7 and radially limits annular space 8 together with outer housing 1.

Housings 1, 6 are disposed horizontally, i.e. with horizontal longitudinal axis 9, whereby outer housing 1 is stationary and inner housing 6 is mounted to rotate about longitudinal axis 9 relative to outer housing 1.

In the center between ring flanges 2 vacuum or overpressure connecting chamber 10 is joined sealingly to the top of outer housing 1. Chamber 10 is sealed from the outside by viewing glass 11 and has connecting piece 120 for a vacuum or overpressure source (not shown) leading thereinto.

In annular space 8 a number of axially parallel mixer shafts 12 are disposed in a ring which are formed in the shown embodiment example as screw conveyors with spirals 13 of like pitch over their total length. The diameter of mixer shafts 12 is selected so that envelope 160 of each mixer shaft 12 formed by an imaginary cylindrical rotational body extends as far as the inner wall of outer housing 1 and the outer wall of inner housing 6 leaving a small working gap free. All mixer shafts 12 are driven in the same direction, as indicated in FIG. 1 by arrows 14. Simultaneously mixer shafts 12 disposed in a ring perform a common revolving motion about longitudinal axis 9 during operation which, like the rotary motion of mixer shafts 12 about their particular longitudinal axis 15, is derived from the rotating motion of inner housing 6 indicated by arrow 16 (FIG. 1).

Instead of or in addition to spirals 13, mixer shafts 12 could also bear (perhaps in certain portions) other mixing tools, e.g. in the form of paddles, toothings or the like if this appears expedient in view of the type of material to be processed. For the same reasons it would also be conceivable to give spirals 13 openings at least in certain portions.

As in particular the developed view of mixer shafts 12 in FIG. 7 indicates, two mixer shafts 12 formed as screw conveyors are combined in each case into groups 17 whose spirals 13 have the same pitch and mesh with narrow working clearance. The embodiment example shown in FIG. 1 has eight such groups 17 each containing one pair of mixer shafts 12, as mentioned. It is basically also possible to combine more than two mixer shafts 12, e.g. three or four mixer shafts, in group 17 in which mixer shafts 12 mesh with spirals 13.

Outer mixer shafts 12 of adjacent groups 17 do not mesh with spirals 13 of their screw conveyors. In the embodiment of FIG. 1 the assembly is such that envelopes 160 of contiguous mixer shafts 12 of adjacent groups 17 extend directly up to each other and touch, with consideration of the necessary working clearance.

Depending on the type and viscosity of the material to be processed, however, a greater distance can also be provided between end mixer shafts 12 of adjacent groups 17, as shown clearly by the embodiment example in FIG. 4. Here there are only six groups 17 of mixer shafts 12 with a comparatively great distance referred to as 19 present therebetween, which corresponds to about one half the diameter of envelope 160. The embodiment of FIG. 4 is suitable in particular for high-viscosity media.

The drive of mixer shafts 12 and their support are apparent in particular from FIGS. 2, 3 which correspond to FIGS. 5, 6 of the second embodiment example of FIG. 4 and to FIGS. 9, 10 of the third embodiment example of FIG. 8. It therefore suffices to explain these parts only once with reference to FIGS. 2, 4; in FIGS. 5, 6 and 9, 10 the same parts are referred to by the same reference numbers as in FIGS. 2, 3.

Fitted sealingly on ring flanges 2 of outer housing 1 are two internal geared wheels 21, 22 which are pinned, i.e. connected in rotationally firm fashion, with particular ring flange 2 by means of alignment pin 23. Internal geared wheel 21 is followed by thrust ring 24 which is axially braced with corresponding ring flange 2 via internal geared wheel 21 located therebetween. Seal rings 26 located therebetween ensure proper sealing conditions between internal geared wheel 21 and thrust ring 24 as well as ring flange 2.

Fitted sealingly on ring flange 7 of inner housing 6 coaxially to internal geared wheel 21 is gearwheel 27 which is pinned to ring flange 7 at 28 in rotationally firm fashion and followed on the outside by housing ring 29 which is axially braced via gearwheel 27 by screw bolts 30. Seal rings 26 are again disposed in the area of the cylindrical parting lines of the parts belonging together.

Figure 12:
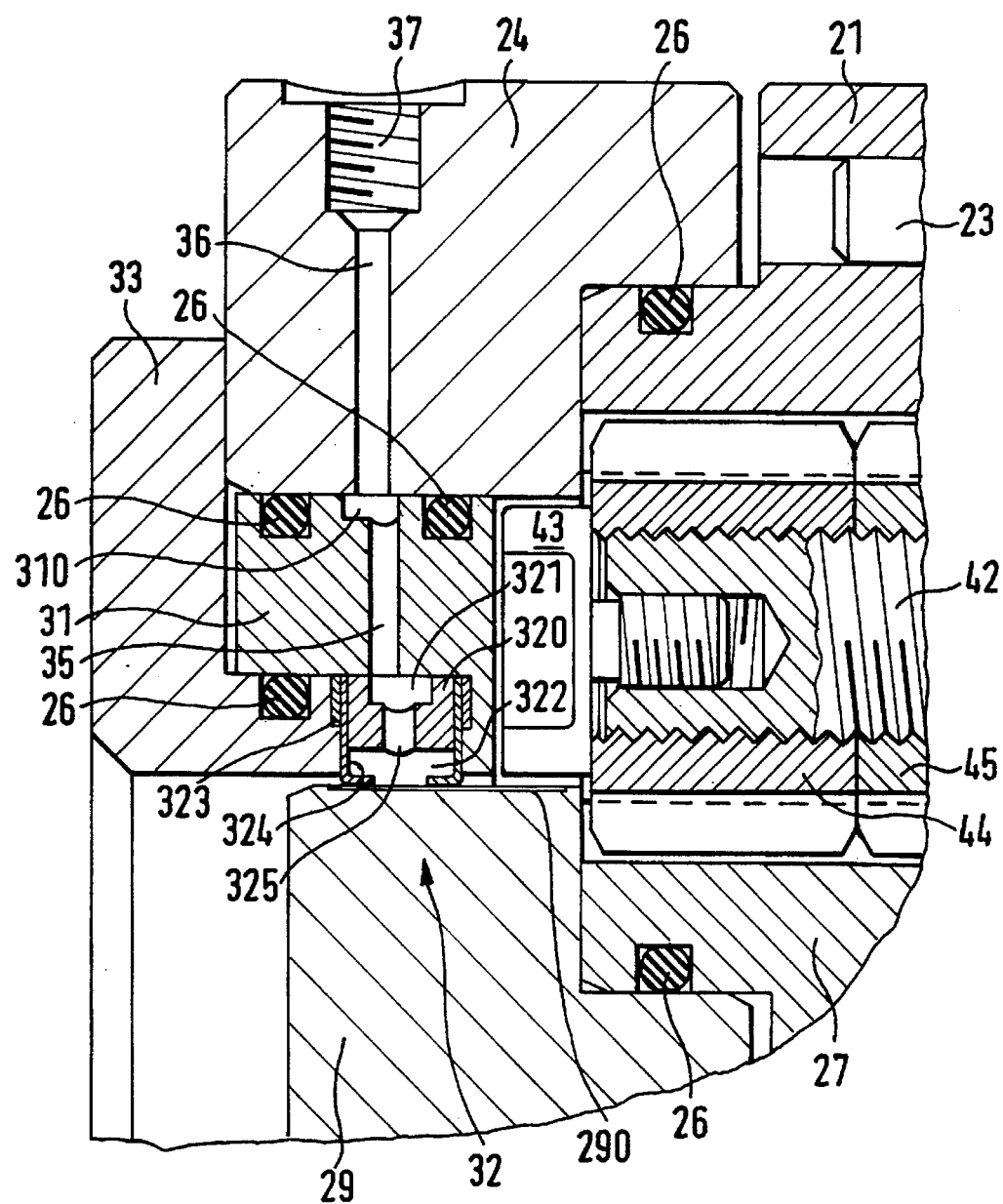
FIG. 12 shows a seal arrangement of the mixer of FIG. 1 in axial section and a detail and on a different scale.

Provided in the annular gap limited between thrust ring 24 and housing ring 29 is seal unit 32 whose structure is seen in particular from FIG. 12. Seal unit 32 has locking ring 31 and fastening ring 33 which is fitted on the outside of thrust ring 24 and screwed to thrust ring 24 in rotationally firm fashion by means of screw bolts 34 (FIG. 2). Seal rings 26 are provided between locking ring 31 and fastening ring 33 as well as housing ring 29. Disposed on the outer lateral surface of locking ring 31 between the two seal rings 26 is annular groove 310 where a plurality of radial bores 35 originate, leading inwardly and crossing locking ring 31. Also, bore 36 present in thrust ring 24 opens into annular groove 310 so as to form a radial channel. Between inside opposing faces of locking ring 31 and of fastening ring 33 two lip seal rings 324 with opposing sealing lips are mutually braced in pressure sealed fashion via two elastomer rings 323 with spacer ring 320 located therebetween. Disposed on the outer periphery of spacer ring 320 in the longitudinal center is likewise annular groove 321 into which radial bores 35 open from the outside and from which further radial bores 325 are guided inwardly to end in inside sealing lip space 322. In this way sealing lip space 322 can be subjected from the outside via connecting fitting 37 on bore 36 to a sealing medium, for example oil, gas, water vapor, etc., the type of which depends on the material to be processed.

The working pressure in sealing lip space 322 is selected so as to be no more than one bar above the working pressure present in working space 8 so that the life of the sealing lips of lip seal rings 324 is not unnecessarily shortened. To ensure particularly good frictional conditions between the sealing lips and the lateral surface of housing ring 29 the lateral surface is provided with oxide ceramic layer 290 whose surface quality is under 0.4 microns. It is also particularly advantageous for the life of these sealing lips that the kind of drive provided permits no radial clearance of housing ring 29.

If required, a cooling ring can be provided at this place instead of locking ring 31, a measure to be considered in particular when the material to be processed is thermoplastic and held at an elevated temperature during the mixing operation. In this case the free-flowing material can pass into the bearing gap in which it is cooled by contact with the cooling ring so that the solidified material produces the vacuum-tight seal from the outside in this area itself.

Connected with gearwheel 27 in rotationally firm fashion via splines is coaxial shaft end 40 which is used for coupling with a power source (not shown) and for setting inner housing 6 rotating.

Engaging internal geared wheel 21 and gearwheel 27 for each mixer shaft 12 are the pinions of pair of pinions 41 which are fitted on coaxial journal 42 and connected therewith via a serration in rotationally firm fashion. Pressure screw 43 is used for axial fixation in each case.

Internal geared wheel 21 and gearwheel 27 are each helical toothed, the two helical toothings being of opposite inclination. One pinion 44 of pair of pinions 41 meshes with internal geared wheel 21 while other pinion 45 meshes with gearwheel 27. Regarded together the pair of pinions therefore has a double helical gearing.

On the opposite side mixer shafts 12 likewise bear coaxial journal 42 on which pinions 46, 47 of pair of pinions 48 are fitted via a corresponding serration in rotationally firm fashion, being again fixed axially by pressure screw 43. One of pinions 46, 47 of each pair of pinions meshes with internal geared wheel 22 connected with outer housing 1 in rotationally firm fashion, while other pinion 46 engages gearwheel 49 which is sealingly fitted on corresponding ring flange 7 and pinned thereto via alignment pin 28 in rotationally firm fashion. As on the driving side, internal geared wheel 22 is followed outwardly by thrust ring 24a connected via fastening ring 33a with locking ring 31a. The sealing of housing ring 29a from working space 8 was explained above with reference to FIG. 12, the corresponding reference numbers applying to FIGS. 3, 6, 10 with the addition "a" so that no repeated explanation is necessary.

Pinions 46, 47 of pair of pinions 48 are helical toothed as on the driving side, the toothings being of opposing inclination. The helical toothings of internal geared wheel 22 and gearwheel 49 are also designed accordingly. To ensure that mixer shafts 12 are supported substantially free from play axially and radially and any unavoidable differences in length of mixer shafts 12 taken up, internal geared wheel 22 and gearwheel 49 are springly prestressed axially relative to internal geared wheel 21 at the driving side and gearwheel 27 at the driving side. For this purpose spring assemblies 50 are fitted on screw bolts 25a connecting thrust ring 24a with ring flange 2 as well as on screw bolts 30a connecting housing ring 29a with ring flange 7 for springily prestressing in the longitudinal direction internal geared wheel 22 guided in longitudinally displaceable fashion in outer housing 1, or gearwheel 49 guided in longitudinally displaceable fashion on inner housing 6. Simultaneously internal geared wheel 22 and gearwheel 49 can perform a small wobbling motion against the effect of Belleville spring assemblies 50 to compensate the abovementioned length tolerances of mixer shafts 12.

It is fundamentally also possible to design the pinions of only one of pairs of pinions 41, 48 with the explained helical toothing and form the other pair of pinions with a spur toothing, the corresponding internal geared wheel or gearwheel then being toothed accordingly. In this case the springy support of the internal geared wheel and gearwheel on one side of the housing can be dispensed with, i.e. spring assemblies 50 omitted.

With the described gear formation of the drive for mixer shafts 12 no separate axial or radial bearings are evidently necessary in the closing portions on the faces of stationary housing 1, which applies equally to the support of inner housing 6. Mixer shafts 12 and inner housing 6 are supported both radially and axially only via their pinions 44, 45 and 46, 47 or gearwheels 27, 49 on stationary internal geared wheels 21, 22.

The splines positively connecting pinions 44, 45 and 46, 47 with mixer shaft journals 42 are formed such that their number of teeth is divisible integrally by the number of mixer shafts 12. Due to the possible use of double-start screw conveyors they should additionally be divisible by four. This makes it possible to replace mixer shafts 12 for different modes of operation without changing the pinions. The serration always ensures that the mixer shafts are driven with the correct mutual angular position to ensure proper engagement of spirals 13 of the screw conveyors of adjacent mixer shafts 12.

During operation the material to be processed flows through the continuous vacuum mixer described with reference to two different embodiments in FIGS. 1, 4 via inlet and outlet connections 101, 102, filling annular space 8 up to level 51 which is just below the upper boundary of the inner housing, as indicated in FIGS. 1, 4. After the power source for shaft end 40 is turned on, inner housing 6 and mixer shafts 12 disposed in a ring rotate in the direction indicated by arrows 16, 20, i.e. in the same, counterclockwise direction. Since the pinions of pairs of pinions 41, 48 roll on the particular stationary internal geared wheel 21 or 22, mixer shafts 12 simultaneously perform a rotary motion about particular longitudinal axis 15 in the same direction, as indicated in FIGS. 1, 4 by arrows 14. Since the screw conveyors of mixer shafts 12 combined into individual groups 17 mesh with spirals 13, local forced transport of the material to be processed takes place in the area of groups 17 within annular space 8, directed toward the driving side with the formation of the screw conveyors selected for the embodiment example. This conveying direction is indicated by arrows 52 in FIGS. 2, 5 and 7 and opposes the direction of flow of the material through annular space 8.

Since no forced transport of the material to be processed takes place in "mixing wedges" 53 (FIG. 7) or in large free spaces 19 in the embodiment of FIG. 4, a level compensation can take place in these areas so that a backflow comes about as indicated by arrows 53 in FIG. 7.

The material to be processed is thus mixed not only between meshing spirals 13 of mixer shafts 12 of groups 17 but also because axial flow conditions opposing the axial direction of flow of the material are produced in certain areas within annular space 8, and because the mixer shafts additionally perform their revolving motion about longitudinal axis 9 thereby successively dipping into and emerging from the material contained within annular space 8.

These necessarily interacting measures produce an excellent mixing effect in the material to be processed.

FIGS. 8 to 11 illustrate a modified embodiment of the novel mixer in the form of a discontinuous vacuum mixer. The basic structure of this mixer is the same as in the described embodiments of the continuous vacuum mixer according to FIGS. 1 to 7. The same parts are therefore provided with the same reference numbers and not explained again.

The discontinuous vacuum mixer differs from the above-described embodiments in that inlet and outlet connections 101, 102 for the material to be processed on outer housing 1 are replaced by processed material outlet 103 disposed sealingly on the outer housing in the longitudinal center and provided with stopper 104. Also, the screw conveyors of mixer shafts 12 are formed and combined with each other into groups 17 in such a way, as apparent from FIG. 11, that meshing spirals 13 of the screw conveyors of adjacent groups 17 result in opposing conveying directions 520 for the local forced transport of the material to be processed. In mixing wedges 530 between individual groups 17 a certain flow also comes about here for level compensation, but the material to be processed is conveyed on substantially closed flow paths within the annular space between adjacent groups 17 because the forced conveying direction of adjacent groups 17 is axially opposed.

During operation a proportioned amount of material to be processed, dimensioned so that maximum level 51 is not exceeded, is introduced into the annular space via connecting chamber 10 with the stopper in place, for example with viewing cover 11 removed. After the mixing time necessary for the particular material to be processed the thoroughly mixed material is let out of annular space 8 again with stopper 104 removed, whereupon annular space 8 may be thoroughly rinsed to prepare the mixer for the next batch. Such rinsing of annular space 8 can also be provided in the continuous vacuum mixer of FIGS. 1, 4 if the material to be processed is to be changed.

Finally it should be mentioned that if mixer shafts 12 are very long they can be supported in at least one place between their end bearings to prevent sagging of mixer shafts 12. This can be achieved in a simple way if a gearwheel disposed on inner housing 6 meshes at the supporting place with pinions of pairs of pinions fitted on mixer shafts 12, the other pinion of each pair meshing with an internal geared wheel on outer housing 1. The same gearing conditions therefore fundamentally exist at the particular supporting place as were explained with reference to gearwheels 27, 49 and associated pairs of pinions 41, 48 and corresponding internal geared wheels 21, 22 on the end. It suffices to provide these elements with spur toothings in each case.

What is claimed is:

1. A mixer for viscous liquids and masses having a housing, the housing having a circular cross section and feeding and removing means for the material to be processed and a number of axially parallel mixer shafts driven in the same direction, the mixer shafts being disposed in a ring within the housing and arranged to perform a common revolving motion about the longitudinal axis of the housing, each mixer shaft defining an elongated cylindrical envelope of space in which the shaft rotates, the mixer characterized in that a first housing first housing unit surrounds an inner coaxial second housing unit, one of the two housing units being stationary and the other being mounted rotatably and driven, the housing units have opposed, closed ends, and are positioned so as to define an annular space therebetween, and the mixer shafts are disposed longitudinally in the annular space to rotate and arranged into meshing groups wherein the envelopes of the mixer shafts forming each meshing group at least partially overlap so as to form screw conveyors and the meshing groups are spaced apart so that the adjacent mixer shaft envelopes of adjacent mixing groups are spaced apart from each other.

2. The mixer of claim 1, characterized in that the mixer shafts forming the meshing group screw conveyors are configured to have a common conveying direction.

3. The mixer of claim 1, characterized in that the mixer shafts forming the meshing group screw conveyors are configured so that the screw conveyors of adjacent meshing groups have opposed conveying directions.

4. The mixer of claim 2, characterized in that the adjacent mixer shafts of adjacent meshing groups are arranged so that the envelopes of the adjacent mixer shafts of the adjacent meshing groups abut.

5. The mixer of claim 2, characterized in that the screw conveyors of contiguous mixer shafts (12) of adjacent meshing groups are arranged so that said adjacent meshing groups are spaced apart from each other so as to define spaces between said meshing groups.

6. The mixer of claim 1, characterized in that the housings units are disposed horizontally so that said inner housing unit has a top height.

7. The mixer of claim 6, characterized in that a working level for the material to be processed is located in the annular space approximately to the top height the inner housing unit.

8. The mixer of claim 1, characterized in that the inner housing unit is adapted to be rotated and the outer housing unit is held stationary.

9. The mixer of claim 8, characterized in that the outer housing unit is provided with a vacuum port.

10. The mixer of claim 8, characterized in that the drive associated with the mixer shafts is derived from the rotating inner housing unit, and the inner housing unit is fitted to be coupled to a power source.

11. The mixer of claim 10, characterized in that the inner housing is connected with at least one coaxial gearwheel which is associated with an internal geared wheel disposed in rotationally firm fashion on the outer housing unit, and the mixer shafts bear rotationally firm pinions which engage the gearwheel or the internal geared wheel.

12. The mixer of claim 11, characterized in that the gearwheel and the internal geared wheel as well as the pinions are helically toothed.

13. The mixer of claim 12, characterized in that the helically toothed gearwheel of the inner housing is associated with an internal geared wheel with opposed helical toothing on the outer housing, and each mixer shaft bears on the end an accordingly toothed pair of pinions one of which engages the gearwheel and the other of which engages the internal geared wheel.

14. The mixer of claim 13, characterized in that the pinions are connected to a particular mixer shaft by means of a toothed serration that has a number of teeth that is divisible integrally by the number of mixer shafts.

15. The mixer of claim 12, characterized in that the mixer shafts are supported axially and radially on the ends only by the pinions on an internal geared wheel and a gearwheel.

16. The mixer of claim 15, characterized in that the inner housing is mounted on the end only via its gearwheel, the pinions of the mixer shafts and the associated internal geared wheel on the outer housing.

17. The mixer of claim 12, characterized in that the at least one of internal geared wheel or the gearwheel are braced elastically against the associated mixer shafts in the axial direction on at least one side of the housing.

\* \* \* \* \*

UNITED STATES PATENT AND TRADEMARK OFFICE
CERTIFICATE OF CORRECTION

PATENT NO. : 5 476 319
DATED      : December 19, 1995
INVENTOR(S): Josef A. BLACH It is certified that error appears in the above-indentified patent and that said Letters Patent is hereby corrected as shown below:

```
Column 8, line 57; delete the second occurrence of
    "first housing".
Column 9, line 14; delete "(12)".
```

Signed and Sealed this

Twentieth Day of August, 1996

Attest:

BRUCE LEHMAN

Attesting Officer     Commissioner of Patents and Trademarks